(12) United States Patent
Grefenstette et al.

(10) Patent No.: US 6,446,035 B1
(45) Date of Patent: Sep. 3, 2002

(54) FINDING GROUPS OF PEOPLE BASED ON LINGUISTICALLY ANALYZABLE CONTENT OF RESOURCES ACCESSED

(75) Inventors: Gregory Grefenstette, Gieres; Claude Roux, Grenoble, both of (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/305,836

(22) Filed: May 5, 1999

(51) Int. Cl.$^7$ .......................... G06F 17/20; G06F 17/27
(52) U.S. Cl. ............................... 704/1; 704/9
(58) Field of Search ................... 704/1, 9, 10; 707/530, 707/531, 102; 345/349, 357, 776; 709/224

(56) References Cited

U.S. PATENT DOCUMENTS

| | | | | |
|---|---|---|---|---|
| 5,895,470 A | | 4/1999 | Pirolli et al. ................. | 707/102 |
| 6,185,614 B1 | * | 2/2001 | Cuomo et al. ............... | 709/224 |
| 6,199,067 B1 | * | 3/2001 | Geller ........................... | 704/1 |
| 6,243,091 B1 | * | 6/2001 | Berstis ........................ | 345/349 |
| 6,256,739 B1 | * | 7/2001 | Skopp et al. ................ | 713/201 |
| 6,310,630 B1 | * | 10/2001 | Kulkarni et al. ............. | 345/776 |

OTHER PUBLICATIONS

Giance et al., "Making Recommender Systems Work for Organizations", Proceedings of PAAM '99, London, UK, Apr. 19–21, 1999.

Pirolli et al., "Silk from a Sow's Ear: Extracting Usable Structures from the Web", Conference on Human Factors in Computing Systems (CHI 96), Vancouver, British Columbia, Canada Apr. 13–18, 1996.

"ISYS HindSite for Netscape Navigator or MS Internet Explorer", Published on the Internet at www.isysdev.com/products/hindsite.htm.

"Pluxy: The pluggable proxy", http://webtools.dyade.fr/pluxy/index.html, published on the internet on Jun. 12, 2000.

Borghoff et al., "Information Technology for Knowledge Management", Berlin, Heidelberg, NewYork: Springer–Verlag 1998, ISBN 3540637648, pp. 34–53.

\* cited by examiner

*Primary Examiner*—Patrick N. Edouard
(74) *Attorney, Agent, or Firm*—Oliff & Berridge, PLC (57) ABSTRACT

Expression/person data are obtained and, in turn, are used to obtain information about groups of people in a population. The people access resources that include linguistically analyzable content, such as Web pages that include text. The expression/person data identify, for each of a set of expression types that occur in the resources, people who have accessed resources that include that type. The group information indicates a group of people who have accessed resources that include instances of expression types that have similar conceptual content. For example, an item of expression/person data can be obtained when a person accesses a Web page in an acquisition mode, by performing linguistic analysis in the background. An expression type can be indicated, for example, by a syntactic relation and a pair of normalized words that occur in the syntactic relation in the analyzed text. The expression/person data can be stored in a database. When a user provides a query that includes a set of words or other expressions, a list of conceptually similar expressions and identifiers of people who have accessed Web pages that include them can be presented on a display.

20 Claims, 6 Drawing Sheets

FINDING GROUPS OF PEOPLE BASED ON LINGUISTICALLY ANALYZABLE CONTENT OF RESOURCES ACCESSED

FIELD OF THE INVENTION

The invention relates to techniques that find groups of people based on behavior.

BACKGROUND

Various conventional techniques have been developed to find groups of people based on behavior. Well-known examples include techniques for creating mailing lists or phone lists based on behavior such as membership in an organization, occupation, or product purchasing behavior, and so forth. Such techniques are frequently employed to target marketing activities, such as mailed advertisements or telemarketing.

Techniques have also been proposed for obtaining information about browsing behavior on the World Wide Web ("WWW" or "the Web").

ISYS HindSite, a product of ISYS/Odyssey Development Inc., described at http://www.isysdev.com/products/hindsite.htm, saves information about where a Web user has been and what the user has seen. The user can perform full text searches on the contents of previously accessed Web pages, even when bookmarks have not been created. Although Netscape Navigator's history facility lists the universal resource locations (URLs) visited in a Web session, HindSite can index every word of every Web page accessed over a timeframe from one week to six months. HindSite's Plain English query allows users to quickly search by making a statement or asking a question in plain English.

Pirolli, P., Pitkow, J., and Rao, R., "Silk from a Sow's Ear: Extracting Usable Structures from the Web", *Conference on Human Factors in Computing Systems* (CHI 96), Vancouver, B.C., Canada, Apr. 13–18 1996, describe techniques that utilize topology and textual similarity between items as well as usage data collected by servers and page meta-information like title and size to form document collections. Pages can be related because they have been collected by a particular community or organization. Categorization and associative retrieval techniques provide a means for monitoring the interaction of users and WWW pages. Data extracted from access logs can include topology, page meta-information, usage frequency and usage paths, and text similarity among all text WWW pages at a Web locality. Servers have the ability to record transactional information consisting of at least the time, the name of the URL being requested, and the machine name making the request. When multiple users from a machine name are suspected, heuristics can be used to disambiguate user paths.

Pirolli et al. also describe techniques that tokenize the text for each WWW page and index the tokenized text using a full-text retrieval engine. Document vectors for a pair of pages can be used to obtain a similarity measure between the two pages. Activation network techniques can be applied to the extracted data for purposes such as predicting the interests of home page visitors or assessing the typical web author at a locality.

SUMMARY OF THE INVENTION

The invention addresses problems that arise in finding groups of people. It is often useful to act in relation to a group of people rather than in relation to an entire population that includes the group. For example, it is often much more efficient to target an advertisement or other message to a group of people who are likely to be interested rather than to the entire population. Similarly, if one is searching for people who meet a description, it can be much more efficient to search over a relatively small group of people likely to meet the description than to search the entire population. Acting in relation to a smaller group rather than an entire population can be beneficial even with smaller populations, such as a company, a workgroup, or a community.

Conventional mailing list techniques, mentioned above, typically depend on relatively superficial information about people, such as occupation, membership in organizations, product purchasing behavior, and the like. As a result, the conventional techniques may not discover groupings of people based on more subtle facts about their behavior.

In general, conventional mailing list techniques also neglect sources of information that have recently become available due to technological advances. For example, many systems have been developed in recent years to provide access to resources such as documents in electronic form. The World Wide Web ("WWW" or the "Web") is an example of such a system that has come into widespread use. Other systems that provide access to resources in electronic form include computers and other devices that can be used to access documents and other resources, and scanners, printers, and digital copiers, in which a resource may be accessed to create an electronic version or for the purpose of providing an electronic version in a print or copy job.

Conversely, conventional techniques for gathering information about resource access behavior do not provide information about groups within a population. For example, HindSite, described above, gathers information about one person's browsing history. But information about one person obviously does not provide information about groups of people. Therefore, HindSite could not provide information about groups.

Other conventional techniques, exemplified by the above-described Pirolli et al. article, are designed to gather and analyze information about browsing behavior of large numbers of users in a relatively anonymous manner. Although such information can be highly informative, these techniques have not been applied to the problems of grouping people.

The invention alleviates these problems by providing techniques that can find groups of people using information about resources the people have accessed. The techniques are applicable where the accessed resources include linguistically analyzable content, such as data defining text or speech. The techniques obtain expression/person data that identify, for each of a set of expression types that occur in the content of the resources, at least one person in the population who has accessed a resource that includes an instance of that type. The techniques use the expression/person data to obtain group information that can indicate a group of people in the population who have accessed resources that include instances of expression types that have similar conceptual content.

The new techniques can be implemented in a system in which resources can be accessed through a network, such as a system that accesses Web pages through the Internet or an intranet. The linguistically analyzable content can be text. For example, text in an accessed Web page can be used to obtain an item of type data indicating an expression type that occurs in the text, such as by performing linguistic analysis. The item of type data can then be associated with an identifier of the person who accessed the Web page, such as a logon name, to obtain an item of expression/person data.

The expression/person data can be stored in a database and the group information can be obtained in response to a query signal from a user. For example, the query signal can indicate a set of expressions, such as a set of words relating to a topic. The query signal can be used to access the expression/person data and obtain output data indicating a group of people who have accessed resources that include expressions having similar conceptual content. Information about the indicated group can then be presented to the user. As a result, the user can find a group of people likely to be interested in the same topic.

Group information could alternatively be obtained by comparing personal profiles. For example, the profile for each person could indicate expression types occurring in resources the person has accessed. Two personal profiles could be compared to find pairs of expressions that have similar conceptual content, with the number of such pairs being a measure of similarity between two people's behavior.

The expression/person data can also indicate resource handles, such as universal resource locations (URLs), that can be used to access resources that include instances of an expression type. The resource handles can be presented together with the information about the indicated group. For example, the URLs can be presented in a way that allows the user to access Web pages.

The techniques can be implemented in a system that includes a resource access device that can be used to access resources, such as a computer, a scanner, a copier, or a printer. The system can also include processing circuitry connected to receive identity information indicating identity of a person who uses a device. The processing circuitry can also receive the content of accessed resources. The processing circuitry can use the identity information and the content of the accessed resources to obtain expression/person data as described above, and can use the expression/person data to obtain group information as described above. The system could also include a database as described above and the processing circuitry could receive query signals from and present group information to a user through user interface devices.

The techniques can also be implemented in an article of manufacture for use in a system that includes a resource access device as described above and also a storage medium access device. The article can include a storage medium and instruction data stored by the storage medium. The system's processor, in executing the instructions indicated by the instruction data, uses the identity information and the content of the accessed resources to obtain expression/person data as described above, and uses the expression/person data to obtain group information as described above.

The new technique can also be implemented in a method of operating a first machine to transfer data to a second over a network, with the transferred data including instruction data as described above.

The techniques can be implemented to passively acquire expression/person data, meaning the data can be obtained by automatic operations performed in background during a person's resource access behavior. For example, a Web page can be accessed and presented to a user in response to a URL, and then automatic operations can obtain text from the Web page, perform linguistic analysis to obtain an item of type data indicating a type of expression, and associate the item of type data with an identifier of the person. The automatic operations can be implemented in a way that the person is not aware they are being performed.

One further aspect of the invention addresses problems that can arise in passively acquiring data in this manner. In some situations, secretly gathering information about a person's behavior may violate legitimate expectations of privacy. On the other hand, awareness that their behavior is being monitored at all times may undesirably modify the way people behave, perhaps inhibiting resource access behavior.

The invention provides a technique that alleviates privacy-related problems like these. The new technique performs automatic operations as described above, but only after a person has provided a signal that expression/person data can be obtained. This technique can be implemented, for example, in a system that has an acquisition mode in which the processing circuitry uses identity information from a device and contents of resources accessed through the device to obtain expression/person data and a non-acquisition mode in which it does not. The device can include input circuitry through which a person can provide a switch signal to switch the system between the two modes. This technique permits each person to control acquisition for the device the person is using and thus avoid privacy-related problems.

Another aspect of the invention addresses a problem that arises with techniques that merely analyze at the word level. For example, HindSite indexes every word of every Web page accessed, and Pirolli et al. similarly mention tokenization and indexing of the text of WWW pages for use in measuring similarity between pairs of pages. But mere indexing or other analysis at the word level provides limited information, since it fails to take into account that meanings do not correspond in a one-to-one manner with words; for example, indexing does not detect instances where different words have similar meanings, nor does it distinguish different meanings of a word, nor does it detect instances where meaning results from a sequence of consecutive words that forms a multi-word expression.

This aspect of the invention alleviates this problem by providing techniques that permit analysis of resource access behavior at a conceptual level. The expression/person data can include concept/person items of data, each indicating a conceptual type of expressions and identifying at least one person who has accessed a resource with an instance of the conceptual type. The expression/person data can be obtained by linguistically analyzing content of a resource to obtain an item of concept data indicating a conceptual type, and by associating the item of concept data with an identifier of the person who accessed the resource. For example, the concept/person item of data can include a pair of normalized words and can identify a type of syntactic relation between them.

Conceptual analysis also makes it possible to construct a personal profile indicating conceptual types that occur in resources a person has accessed or indicating a person's level of interest in each of a number of conceptual clusters.

The new techniques are advantageous because, in comparison with conventional mailing list techniques, they allow group identification based on resource access and browsing behavior that may be informative about a person's underlying interests. In addition, the behavior can be automatically recorded and analyzed, and information about it can even be passively acquired, allowing collection of much more information. Passive acquisition of Web browsing behavior is especially informative. Acquisition can be controlled, however, by the person who is browsing, to avoid privacy issues.

The techniques can be implemented to obtain conceptual information. Conceptual analysis is advantageous because it provides more detail than conventional techniques that merely index words or save URLs of accessed Web pages. For example, conceptual analysis makes it possible to group people together because they access different Web pages that relate to identical or similar concepts, even though the pages have unrelated URLs and the concepts are couched in much different words on the two pages. Conceptual analysis also makes it possible to compare people based on profiles of their levels of interest in a set of concepts.

Group information obtained with the techniques is further advantageous as a tool for bootstrapping a user community for a recommender system. In other words, the recommender system can use the group information as a first approximation of user interests, rather than acquiring information about user interests from scratch.

Group information obtained with the techniques is further advantageous in the situation where the group is a work group, such as an enterprise, because the information can be used to help identify experts about certain concepts within the group.

The following description, the drawings, and the claims further set forth these and other aspects, objects, features, and advantages of the invention.

DETAILED DESCRIPTION

A. Conceptual Background

The following definitions are helpful in understanding the broad scope of the invention, and the terms defined below have the indicated meanings throughout this application, including the claims.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of diskettes storing a single body of data would together be a storage medium.

A "storage medium access device" is a device that includes circuitry that can access data on a data storage medium. Examples include drives for accessing magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "processor" or "processing circuitry" is a component of circuitry that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations. A processor may include one or more central processing units or other processing components.

A processor or processing circuitry performs an operation or a function "automatically" when it performs the operation or function independent of concurrent human intervention or control.

Any two components are "connected" when there is a combination of circuitry that can transfer signals from one of the components to the other. For example, two components are "connected" by any combination of connections between them that permits transfer of signals from one of the components to the other.

A "network" is a combination of circuitry through which a connection for transfer of data can be established between machines. An operation "establishes a connection over" a network if the connection does not exist before the operation begins and the operation causes the connection to exist.

A processor or other component of circuitry "uses" an item of data in performing an operation when the result of the operation depends on the value of the item.

An "instruction" is an item of data that a processor can use to determine its own operation. A processor "executes" a set of instructions when it uses the instructions to determine its operations.

A "database" is a component within which data may be stored for subsequent access and retrieval. A database is typically implemented with data stored in memory and instructions that can be executed by a processor to access the stored data.

To "obtain" or "produce" an item of data is to perform any combination of operations that begins without the item of data and that results in the item of data. To obtain a first item of data "based on" a second item of data is to use the second item to obtain the first item.

An item of data "indicates" a thing, event, or characteristic when the item has a value that depends on the existence or occurrence of the thing, event, or characteristic can be obtained by operating on the item of data. An item of data "indicates" another value when the item's value is equal to or depends on the other value.

An item of data "identifies" one of a set of items if the item of data has a value that is unique to the identified item. For example, an item of data identifies one of a population of people if the item has a value that identifies only one person in the population.

A first item of data "includes" information from a second item of data if the value of the first item of data depends on the information from the second item of data. For example, the second item of data can be used to obtain the first item of data in such a way that the value of the first item of data depends on the information.

To "obtain" or "produce" an item of information is to perform any combination of operations that makes the information available, such as by obtaining an item of data that includes the information or by presenting the information to a user.

An item of information "indicates" a thing, event, or characteristic when an item of data that includes the item of information would also indicate the thing, event, or characteristic.

A "natural language" is an identified system of symbols used for human expression and communication within a community, such as a country, region, or locality or an ethnic or occupational group, during a period of time. Some natural languages have a standard system that is considered correct, but the term "natural language" as used herein could apply to a dialect, vernacular, jargon, cant, argot, or patois, if identified as distinct due to differences such as pronunciation, grammar, or vocabulary. The natural languages include ancient languages such as Latin, ancient Greek, ancient Hebrew, and so forth, and also include synthetic languages such as Esperanto and Unified Natural Language (UNL).

A "linguistic expression" or "expression" is a semantically meaningful arrangement of symbols that can occur in a natural language. Examples of expressions are words (including abbreviations, acronyms, contractions, misspellings, and other semantically meaningful variants), multi-word expressions, phrases, clauses, sentences, paragraphs, documents, and so forth. Expressions in a written, printed, or phonetically transcribed form are referred to wherein as "text". Expressions in a spoken or other audible form are referred to wherein as "speech".

An item of data "defines" an expression if the item includes sufficient information to reproduce the expression. For example, the data may include codes, such a character codes or phoneme codes; binary or gray-scale values that define an image of a text; or intensity level data that define an item of speech.

An "expression type" is a type of which expressions may be instances. For example, "dog", "Dog", "DOG", "dogs", "Dogs", and "DOGS" are all instances of an expression type for the noun "dog".

The "conceptual content" of an expression is the combination of meanings conveyed by the expression as a whole in a particular context. Two or more expression types have "similar conceptual content" if instances of the expression types can convey similar conceptual content.

A "conceptual type" is an expression type whose instances have similar conceptual content. Instances of a conceptual type can include a set of synonymous words; a set of syntactic relations between m specified words, where m>1; a word with an indication of its sense; the forms of a multi-word expression; a set of m words that occur within a string of n words where n>m>1; a category of documents that share a specified set of words; and so forth.

An operation performs "linguistic analysis" on an item of data if the operation obtains information about features of one or more expressions defined by the data. For example, operations can perform linguistic analysis by recognizing expressions or elements that form expressions, such as through optical character recognition or speech recognition; or operations may begin with data defining a sequence of such elements and obtain information about expressions formed by the elements, such as by tokenizing. Or operations may begin with data defining a sequence of expressions, such as words, and obtain further information about the expressions, such as by language identification, lemmatizing or other normalization, shallow parsing, retrieval of synonyms, translation, and so forth.

B. General Features

Figure 1:
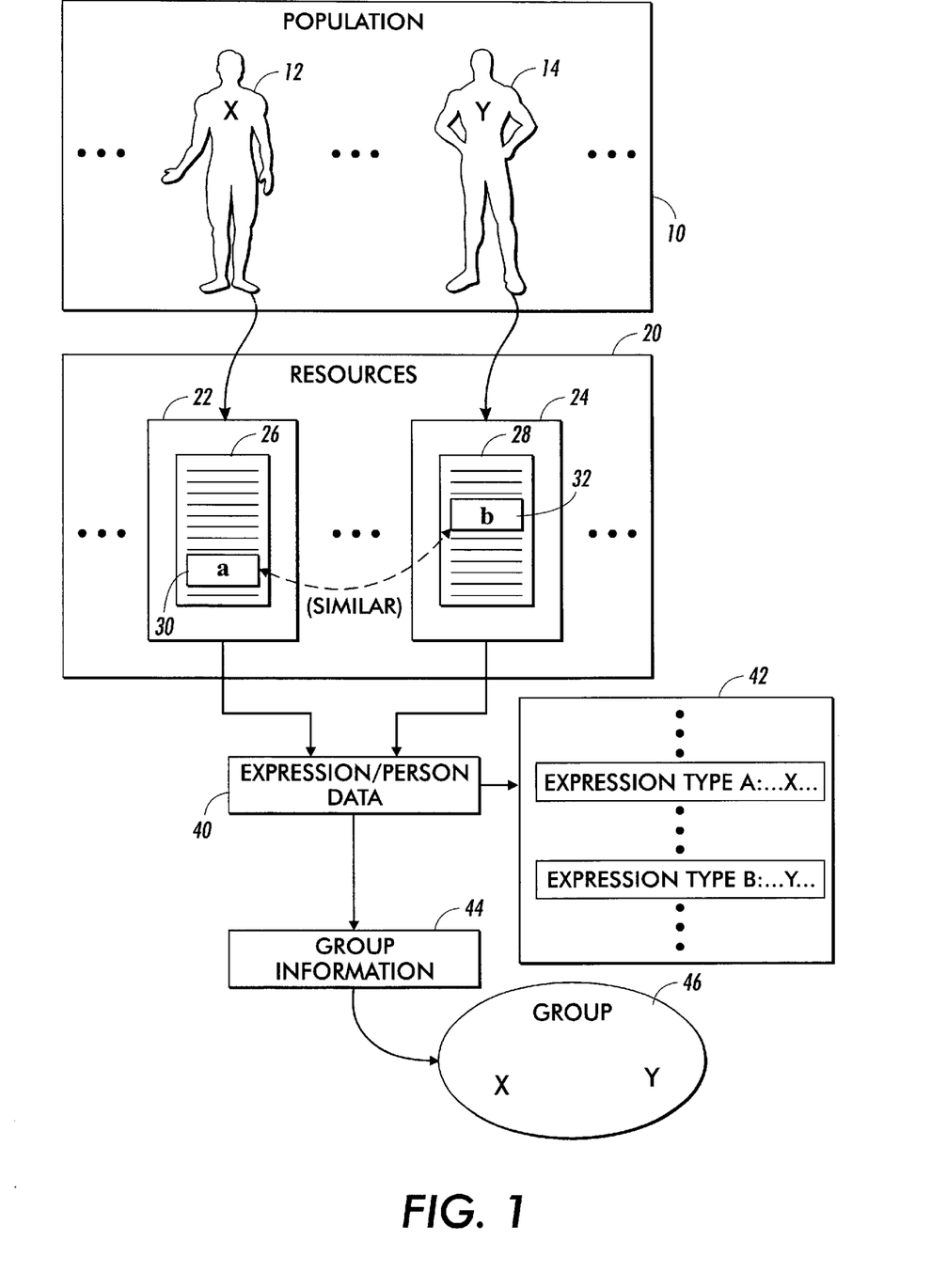
FIG. 1 is a schematic flow diagram showing how expression/person data can be used to obtain group information.
Figure 2:
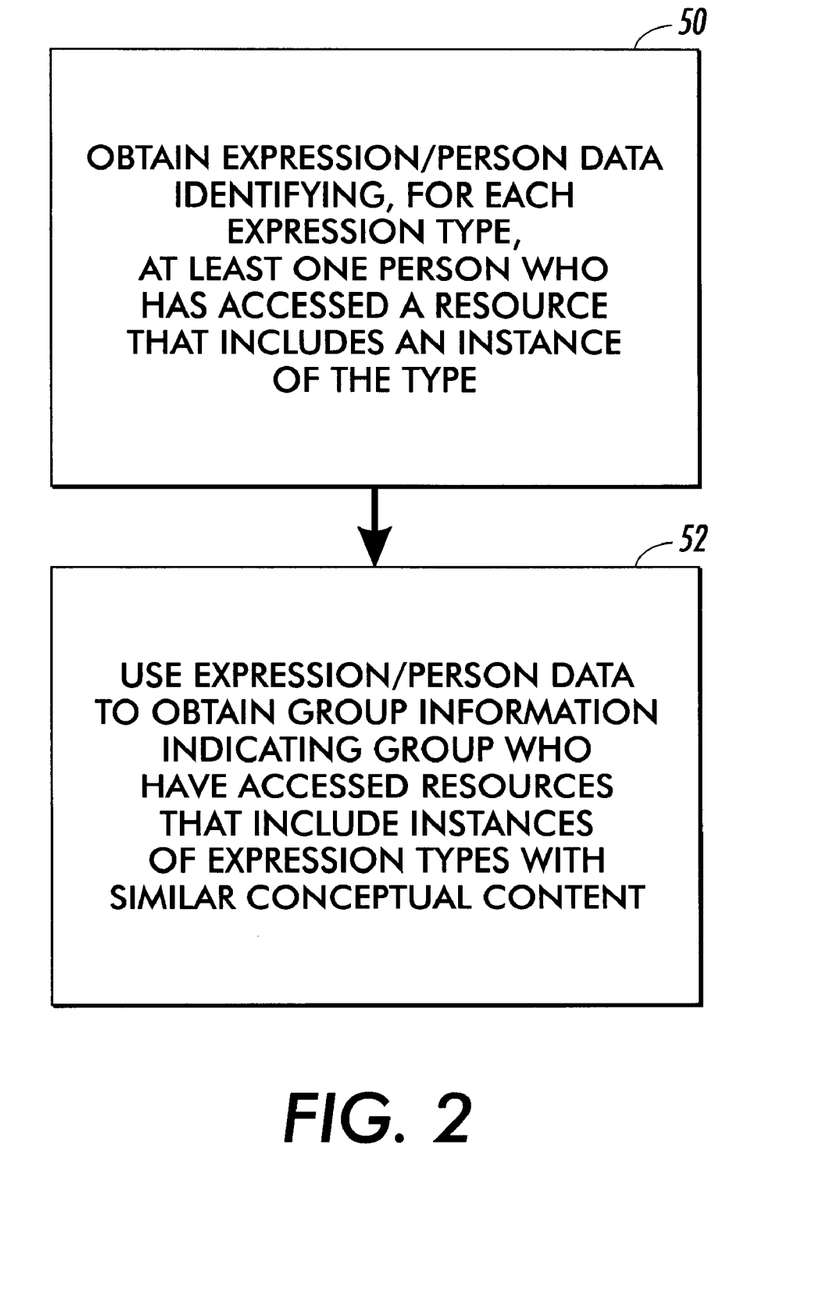
FIG. 2 is a flow diagram showing general acts in using expression/person data to obtain group information.
Figure 3:
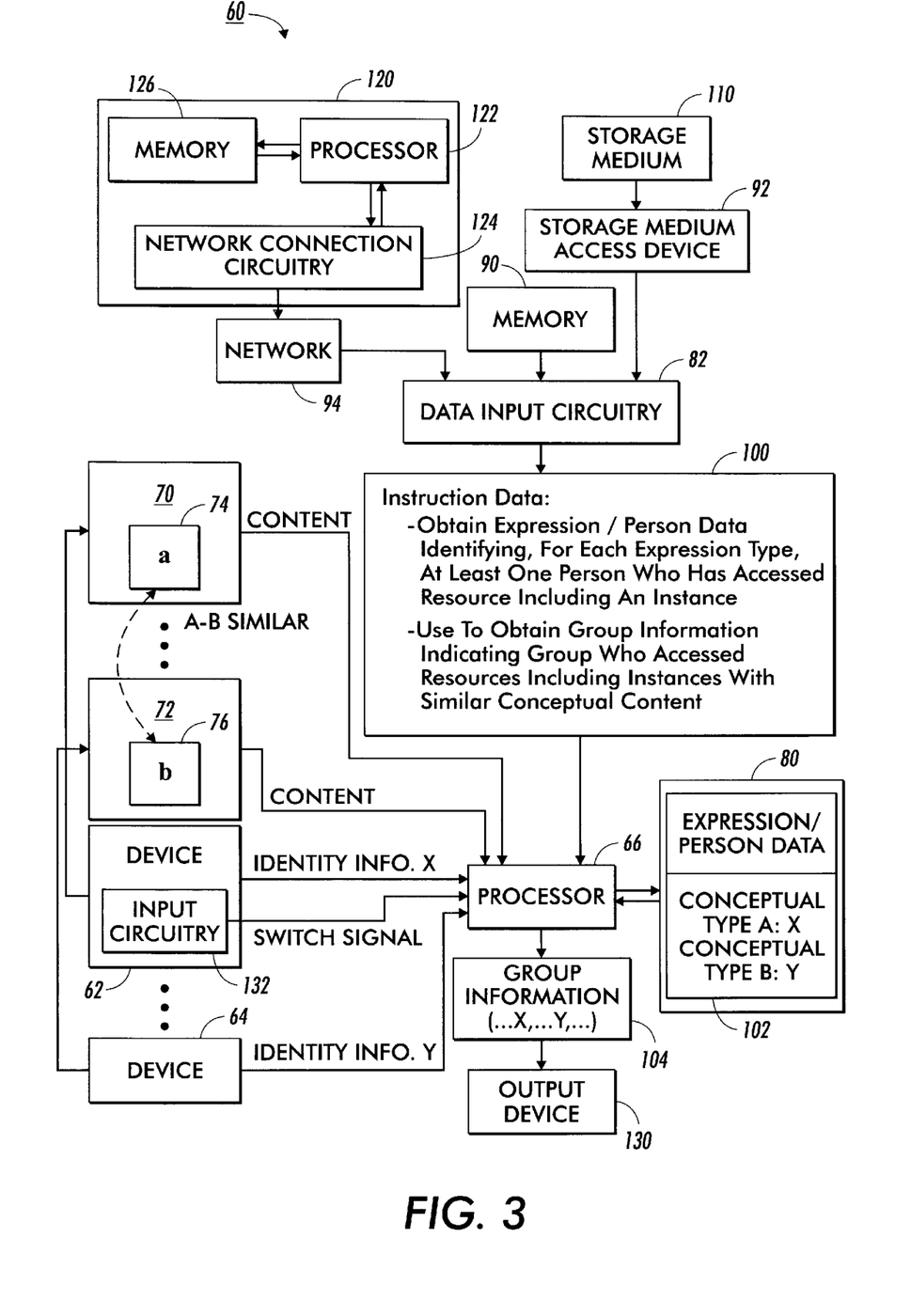
FIG. 3 is a schematic circuit diagram showing components of a system that can use expression/person data to obtain group information.

FIGS. 1–3 illustrate general features of the invention.

FIG. 1 is a flow diagram that shows schematically how expression/person data can be used to obtain information indicating a group of people.

Population 10 illustratively includes person 12, identified by an "X", and person 14, identified by a "Y". Resources 20 illustratively include resource 22 and resource 24, each of which could, for example, be a Web page. Resource 22 includes content 26 and has been accessed by person 12, while resource 24 includes content 28 and has been accessed by person 14. Content 26 and 28 can both be linguistically analyzed, and content 26 includes expression 30, labeled "a", while content 28 includes expression 32, labeled "b". Expressions 30 and 32 are instances, respectively, of two different types of expressions, type "A" and type "B", but, as indicated by the dashed line connecting them in FIG. 1, types "A" and "B" have similar conceptual content.

Expression/person data 40 can thus be obtained. As shown in box 42, expression/person data 40 can identify, for each of expression types "A" and "B", at least one person in population 10 who has accessed a resource that includes an instance of the expression type. Specifically, person 12, identified as "X", has accessed a resource that includes an instance of type "A", while person 14, identified as "Y", has accessed a resource that includes an instance of type "B".

Expression/person data 40 can be used to obtain group information 44, which indicates group 46 as shown. Group 46 includes persons 12 and 14, identified as "X" and "A", who have accessed resources that are different but include expressions that have similar conceptual content.

In box 50 in FIG. 2, a technique obtains expression/person data identifying, for each of a set of expression types that occur in linguistically analyzable content of resources, at least one person who has accessed a resource that includes an instance of the type. Then, in box 52, the technique uses the expression/person data to obtain group information indicating at least one group of people who have accessed resources that include instances of expression types that have similar conceptual content.

System 60 in FIG. 3 includes devices 62 through 64 and processor 66. Devices 62 through 64 can include computers (such as personal computers and workstations), scanners, copiers, printers, and various other devices that can be used by people, such as in population 10 in FIG. 1, to access resources 70 through 72. As illustrated, resources 70 and 72 respectively include expressions 74 and 76, labeled "a" and "b" respectively as in FIG. 1, respectively, which are of types A and B that have similar conceptual content, as suggested by the dashed line between them.

Processor 66 is connected to receive identity information from devices 62 through 64 indicating identities of people using them, illustratively "X" and "Y". Processor 66 is also connected for receiving content of resources 70 through 72 when they are accessed by devices 62 through 64. Processor 66 is also connected for accessing data in memory 80. Processor 66 is also connected for receiving data through data input circuitry 82, which can illustratively provide data received from connections to memory 90, storage medium access device 92, or network 94.

Instruction data 100 illustratively provided by data input circuitry 82 indicates instructions that processor 66 can execute. In executing the instructions indicated by instruction data 100, processor 66 uses the identity information and the content of accessed resources 70 through 72 to obtain expression/person data 102 identifying, for each of a set of expression types such as types A and B, at least one person who has accessed a resource that includes an instance of that type. Processor 66 also uses expression/person data 102 to obtain group information 104 indicating at least one group of people who have accessed resources that include instances of expression types that have similar conceptual content, in this case a group that includes X and Y.

As shown, expression/person data 102 can be held in memory 80 and types A and B can be conceptual types. Other data can be included in or otherwise associated with expression/person data 102; for example, time stamps indicating when an item of data was created, a resource identifier such as a URL identifying the resource from which an item of data was derived, and so forth.

As noted above, FIG. 3 illustrates three possible sources from which data input circuitry 82 could provide data to processor 66—memory 90, storage medium access device 92, and network 94.

Memory 90 could be any conventional memory within system 60, including random access memory (RAM) or read-only memory (ROM), or could be a peripheral or remote memory device of any kind.

Storage medium access device 92 could be a drive or other appropriate device or circuitry for accessing storage medium 110, which could, for example, be a magnetic medium such as a set of one or more tapes, diskettes, or floppy disks; an optical medium such as a set of one or more CD-ROMs; or any other appropriate medium for storing data. Storage medium 110 could be a part of system 60, a part of a server or other peripheral or remote memory device, or a software product. In each of these cases, storage medium 110 is an article of manufacture that can be used in a machine or system.

Network 94 can provide a body of data from machine 120. Processor 122 in machine 120 can establish a connection with processor 66 over network 94 through network connection circuitry 124 and data input circuitry 82. Either processor could initiate the connection, and the connection could be established by any appropriate protocol. Then processor 122 can access instruction data stored in memory 126 and transfer the instruction data to processor 66 over network 94. Processor 66 can store the instruction data in memory 80 or elsewhere, and can then execute the instructions to obtain expression/person data and group information as described above.

FIG. 3 also illustrates that processor 66 can be connected to output device 130 for providing results, such as to a user via a display.

FIG. 3 also illustrates that device 62 or, more generally, any of devices 62 through 64 can include input circuitry 132 for providing switch signals to processor 66 (or to another component that controls input from a device to processor 66) to switch between an acquisition mode and a non-acquisition mode for the device. In acquisition mode, processor 66 uses identity information from the device and content of resources accessed through the device to obtain expression/person data 102, but in non-acquisition mode it does not.

C. Implementations

The general features described above could be implemented in numerous ways on various machines to use expression/person data to obtain group information. An implementation described below has been implemented with a variety of client machines including PCs and Sun workstations and with Apache Web proxy servers implemented on Sun workstations running Unix operating systems and executing Common Gateway Interface (cgi) scripts.

C.1. System

A prototype system has been implemented for passively capturing an organization-related view of the Web by conceptually indexing Web pages browsed by workers who have provided signals to place themselves in an acquisition mode referred to herein as "work mode". Conceptual indexing is performed by converting the HTML content of Web pages viewed by the workers into text and by then linguistically analyzing the content using services available on a network.

An item of data indicating each extracted concept is stored in an entry in a centralized database. The entry also includes a user identifier ("user-id"), a URL for the accessed Web page that includes the extracted concept, and a time stamp indicating when access occurred. The database can then be queried to answer questions about what Web pages workers have seen on a specified topic or which workers are interested in a specified topic.

Figure 4:
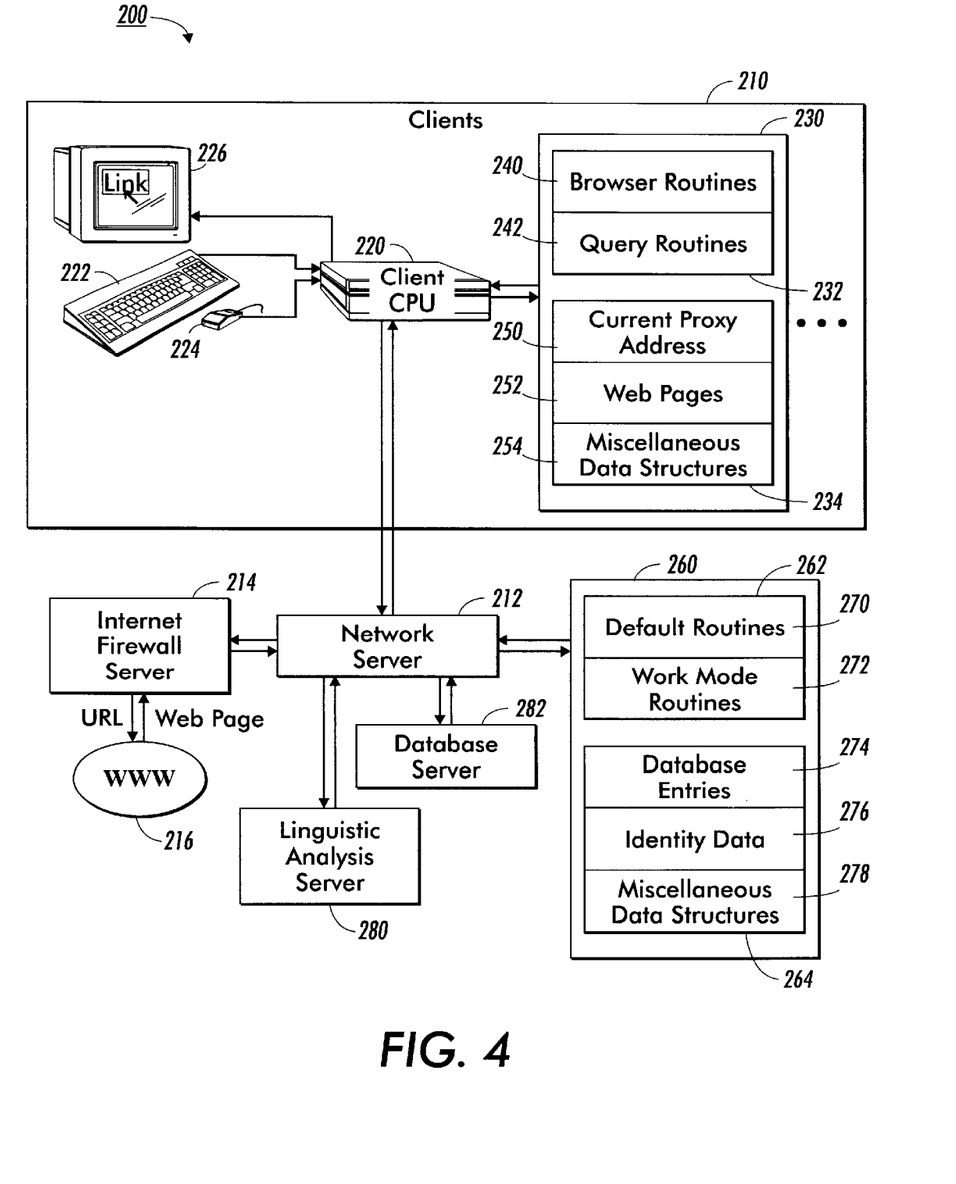
FIG. 4 is a schematic block diagram showing components of a prototype implementation.

FIG. 4 shows components of prototype system 200, which is based on a client-server architecture in which clients 210 are served by proxy server 212 connected to Internet firewall server 214. Firewall server 214 in turn connects to other servers and can be thought of as connecting to World Wide Web 216, while providing appropriate firewall protection for connecting to external Web sites through the Internet.

Clients 210 could be implemented with various machines in a variety of ways. An example is shown, with client central processing unit (CPU) 220 connected for providing signals to and receiving signals from proxy server 212. CPU 220 receives signals from a user through keyboard 222 and mouse 224, and provides data defining images to be presented by display 226, illustratively showing selection of a link in a Web page. CPU 220 is also connected for accessing memory 230, which includes program memory 232 and data memory 234.

Program memory 232 can store various software routines for execution by CPU 220, including browser routines 240 and query routines 242. Browser routines 240 can be a conventional Web browser such as Netscape Navigator or Microsoft Internet Explorer, while query routines 242 can be implemented as described below or with conventional database access software such as Topic from Verity, Inc. Web-based database query, an example of which is described below, can be performed by calling query routines 242 from browser routines 240 using conventional techniques such as cgi scripts.

Data memory 234 can store current proxy address 250, an Internet protocol (IP) address accessible through browser routines 240 to switch in and out of work mode. Data memory 234 can also store the contents of one or more Web pages 252 under control of browser routines 240 and can also store miscellaneous data structures 254.

Proxy server 212 can similarly be connected for accessing memory 260, with program memory 262 and data memory 264.

Program memory 262 illustratively stores routines for two proxy services—default routines 270, called when current proxy address 234 has a default value, and work mode routines 272, called when current proxy address 234 is set to a work mode value. The routines for both services can include proxy code for performing the basic proxy function of providing a URL on the Internet to obtain a Web page, and each can be implemented as an Apache server of the type described at http://www.apache.org. In addition, work mode routines 272 can include cgi scripts called from the proxy code, and can therefore perform additional operations as described in greater detail below.

Data memory 264 illustratively stores database entries 274 and identity data 274 with information about the identities of people who access resources, as well as miscellaneous data structures 276. Identity data 274 could, for example, include a table indicating, for each client machine's IP address, the identity of the person using the machine. FIG. 4 also shows two additional servers that can be accessed by proxy server 212 in executing work mode routines 272. Linguistic analysis server 280 can be implemented as described in copending, coassigned U.S. patent application Ser. No. 09/221,232, entitled "Executable for Requesting a Linguistic Service", incorporated herein by reference. Database server 282 can be a server for storing database entries as described below or could be a server running a conventional database system, such as Topic from Verity, Inc.

It will be understood that proxy server 212 and client CPU 220 together implement functions of processor 66 in FIG. 3, while database entries stored in database server 282 are an implementation of expression/person data 102. Group information 104 can be information derived from data retrieved from database server 282 and can be presented to a user through display 226. Clients 210 implement devices 62 through 64 in FIG. 3, with keyboard 222 and mouse 224 implementing input circuitry 132. Web pages accessible through WWW 216 implement resources 70 through 72.

C.2. Operations

Figure 5:
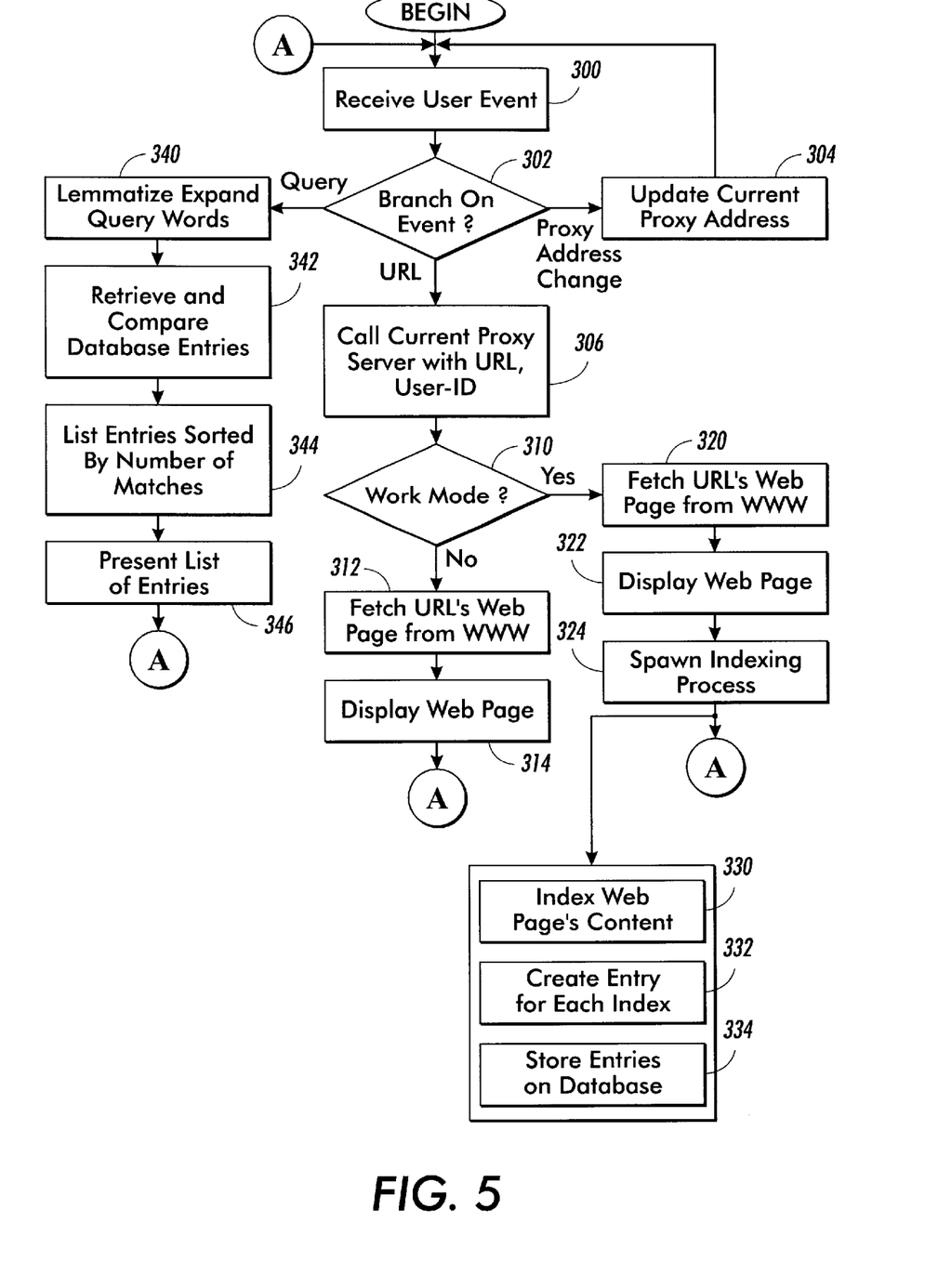
FIG. 5 is a flow chart showing operations of the components in FIG. 4.

FIG. 5 shows acts that can be performed by components in the prototype implementation shown in FIG. 4.

The act in box 300 begins an overall iterative loop that handles a user event, where each user event is a sequence of signals from keyboard 222 and mouse 224 received by client CPU 220 that are together sufficient to determine what response system 200 should provide. The act in box 302 then branches based on the nature of the event received in box 300. If the event is a request to change proxy address, which could be provided through interacting with browser routines 232, the act in box 304, performed by CPU 220, updates the current proxy address 250 before returning to receive the next user event in box 300.

If the event is a URL, which could also be provided through interacting with browser routines, the act in box 306, performed by CPU 220, uses current proxy address 250 to call the proxy server 212 with the URL and a user-id. In the prototype implementation, the user-id is the IP address of CPU 220, but another user-id might be provided, such as a person's name or login name.

As shown in box 310, the operations of proxy server 212 in response to the call from box 306 depend on whether the call includes the IP address of default routines 270 or work mode routines 272.

If the default, the act in box 312 fetches the URL's Web page from the WWW. This act can be implemented with a web mirroring utility such as wget, available from ftp://sunsite.auc.dk/pub/infosystems/wget/, which can perform a fetch using the common firewall proxy for an organization. The act in box 314 then provides the retrieved Web page to CPU 220 for presentation on display 226 in the conventional manner. Then system 200 returns to receive the next user event in box 300.

If in work mode, the act in box 320 fetches the URL's Web page and the act in box 322 provides the Web page for presentation as in boxes 312 and 314, described above. It is worth noting that the person who provided the URL should not notice a delay in presentation of Web pages during the work mode. In either mode, the retrieval of the Web page is likely to be the longest step, and depends on the firewall proxy, which is invoked in either mode.

In work mode, however, proxy server 212 continues by performing the act in box 324, which spawns a process to perform the acts in boxes 330, 332, and 334. When the process has been spawned, system 200 returns to wait for the next user event in box 300, while the acts in boxes 330, 332, and 334 are performed as background tasks in parallel with other operations of system 200.

In box 330, server 212, or another processor executing the spawned process, performs linguistic analysis on the Web page's contents to index the Web page, by providing requests for linguistic services to linguistic analysis server 280. In the prototype implementation, each index is an extracted relationship that includes an identifier of a syntactic relationship and two or more normalized words.

In the prototype implementation, the act in box 330 includes several operations that can be performed by linguistic analysis server 280. The content of the Web page is first converted into ordinary text, such as by removing HTML markings. Then, automatic language identification is performed on the ordinary text, which could, for example, be implemented by techniques as described in copending, coassigned U.S. patent application Ser. No. 09/219,615, entitled "Automatic Language Identification Using Both N-Gram And Word Information", incorporated herein by reference. Then, language-specific operations can be performed on the ordinary text to extract the relations. For example, the text can be sent to a shallow parser as described in Grefenstette, G., "Light Parsing as Finite-State Filtering", *Proceedings ECAI'96 Workshop on Extended Finite-State Models of Language*, Budapest, Aug. 11–12 1996. As can be understood from those documents, a shallow parser tokenizes and normalizes or lemmatizes the text, while eliminating stop or function words, and then returns syntactically tagged normalized relations such as:

NN, press, release
SUBJ, community, condemn
DOBJ, condemn, proposal
NN, encryption, service
NN, consultation, paper
ADJ, strong, method
ADJ, secure, communication
ADJ, commercial, use
ADJ, growing, popularity In each of these relations, the first field indicates a syntactic relation between the remaining normalized words or lemmas. "NN" means a noun modifying another noun, "ADJ" means an adjective modifying a noun, "SUBJ" means that the next work is the subject of the following verb, "DOBJ" means that the next verb had the last word as a direct object, and so forth. The syntactic relations can be understood from Grefenstette, G., *Explorations in Automatic Thesaurus Discovery*, Boston: Kluwer Academic, 1994, p. 37, and further tags for additional categories of syntactic relations are set forth at http://www.xrce.xerox.com/research/mltt/Tools/sextant.html.

Each index from box 330 is used in box 332 to create an entry that also includes the URL and user-id from box 306, another URL identifying the Web site from which the Web page was retrieved, and the time of retrieval. The act in box 334 stores the entries from box 332 in a database by providing them to database server 282 in the conventional manner. In the prototype implementation, the database has been implemented as an ascii file with one entry per line. Then system 200 returns to wait for the next user event in box 300.

If the user event from box 300 is a query for the database of entries, the act in box 340, performed by CPU 220 through server 212, makes calls to linguistic analysis server 280 to lemmatize and expand each word of the query. The act in box 340 thus produces an expanded query with several related lemmas for each word of the original query entered by the user. Expansion of a lemma by adding other members of the same relational family can be performed as described in copending, coassigned U.S. patent application Ser. No. 09/ZZZ,ZZZ (Attorney Docket No. R/98022Q), entitled "Identifying a Group of Words Using Modified Query Words Obtained from Successive Suffix Relationships", incorporated herein by reference. If the query includes the word "communicating", for example, with the lemma "communicate", expansion could also produce the related lemmas "communication", "communicator", and so forth.

The act in box 342 retrieves each entry from the database, such as by standard Unix calls such as grep or awk to database server 282. The act in box 342 compares the lemmas in each entry with the lemmas obtained in box 340 and obtains, for each entry, a count of the number of lemmas in the entry that match lemmas from box 340. The act in box 344 then obtains a list of entries that have at least one match, sorted by the number of matches, and with entries that have the same number of matches in arbitrary order such as alphabetically. The act in box 346, performed by CPU 220, presents the list from box 344 on display 226. Then system 200 returns to wait for the next user event in box 300.

Figure 6:
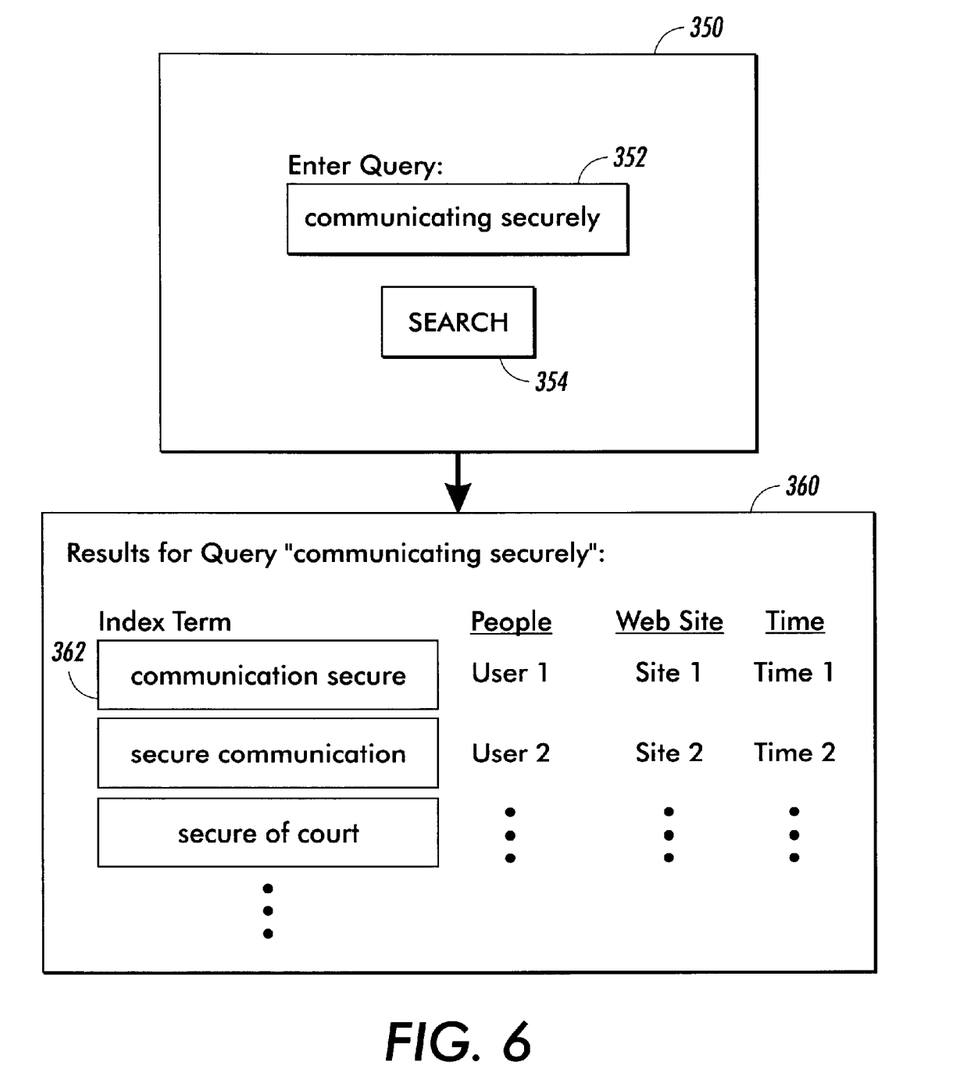
FIG. 6 is a schematic flow diagram showing screen displays that could occur in querying the database server in FIG. 4.

FIG. 6 shows features of images that can be presented on display 226 in implementing the acts in boxes 300 and 346 in FIG. 5 using a browser-based user interface. Screen 350 includes field 352 in which a user can type and edit expressions to form a query. When the user presses the enter key on keyboard 222 or selects field 354, the query in field 352 is transmitted to proxy server 212 and the acts in boxes 340, 342, 344, and 346 are then performed. In the illustrated example, the query is "communicating securely".

Proxy server 212 returns a list of entries with index terms that match lemmas in the expanded query, as described above in relation to box 344 in FIG. 5. Alternatively, the raw query could be provided to database server 282, which could expand the query and retrieve entries that meet an appropriate criterion for similarity in accordance with conventional relational database techniques. CPU 220, in executing query routines 242, presents screen 360 on display 226. Screen 360 repeats the query and then lists, for each entry returned, the index term, an identifier of a user, an identifier of the Web site on which the index term was accessed by the user, and the time of access. For the example in FIG. 6, the first two index terms "communication secure" and "secure communication" each have two lemmas that match the expanded lemmas obtained from the query "communicating securely", and therefore they precede "secure of court" on the list because it only has one matching lemma.

Expanded queries obtained by lemmatizing and expanding query words can be compared to index terms of the type described above, with a syntactic relation and two lemmas that occur in the relation, to produce useful information about groups. Screen 360 in FIG. 6 illustrates this because it shows how a list of entries obtained in this manner can be presented to a user in a way that indicates groups of people. For example, the user can select the users identified in the N top-ranked entries, where N could be five or any other appropriate group size. The N top-ranked entries indicate a group of people who have accessed Web pages with similar conceptual content. The user can then take appropriate action based on the group information obtained from screen 360.

Frame 362 around the index term "communication secure" indicates a link to the Web page viewed by User1 at Time1, as do the other frames in the same column in FIG. 6. Therefore, screen 360 also allows the user to select a link leading to the Web page that was viewed by a member of the group shown. By following the links in the entries, the user can find out what other members of the group have seen on Web pages with similar conceptual content, providing additional information about the group.

It can be seen that the acts in FIG. 5 implement the general acts in FIG. 2 as follows: The acts in boxes 330, 332, and 334 implement the act in box 50 in FIG. 2, while the acts in boxes 340, 342, 344, and 346 implement the act in box 52.

D. Variations

The implementations described above could be varied in numerous ways within the scope of the invention.

The implementation described above has been successfully executed using machines specified above, but implementations could be executed on other machines.

The implementation described above has been successfully executed using programming environments and platforms specified above, but other programming environments and platforms could be used.

The implementation described above is based on a client-server architecture, but the invention could be implemented in other types of architectures. For example, rather than resource access devices that are computers, the invention could be implemented with devices that include scanners, such as copiers and fax machines, or with devices that are printers.

The implementation described above obtains information about Web browsing behavior and about conceptual content of text on Web pages, but the invention could be implemented to obtain information about many other types of resource access behavior, and could be implemented to obtain information about other many other types of linguistically analyzable content of resources, including image data defining images that include text, such as in bit-map or page description language form, and intensity data defining speech. For example, the invention could be applied to extract data from other types of documents when created or retrieved, from jobs submitted to printers or from scanned documents, such as into digital photocopiers or fax machines.

The implementation described above does not distinguish between Web pages that are accessed, but obtains information about expression types that occur in each Web page accessed by a user. The invention could be implemented, however, with an appropriate technique for sampling resources from among those accessed or for sampling portions of the linguistically analyzable content of resources. Further, the invention could be implemented with a criterion to determine whether a resource or a part of the linguistically analyzable content of a resource was of interest to a person; in the case of Web pages, the criterion could be based on information obtained by the device used to access the pages, such as the length of time a Web page was presented on a display, the extent or timing of scroll bar activity to view a complete Web page, a measure of the visual activity of the person while viewing a Web page, and so forth.

The implementation described above performs linguistic analysis using shallow parsing to obtain conceptual types, each characterized by a syntactic category and a set of two or more normalized words or lemmas, but information about many other kinds of expression types could be obtained using appropriate linguistic analysis operations, including optical character recognition or speech recognition if appropriate. For example, thesauri could be used to map expressions to conceptual classes, automatic translation techniques could be used to map expressions from different languages to conceptual classes, and so forth. In addition, software tools such as ThingFinder, available from Inxight Corp., a subsidiary of Xerox Corporation, could be used to map expressions to classes by semantically tagging text.

The implementation described above obtains expression/person data that includes an item of data indicating an expression type and a user ID that is an IP address of the user's machine. The invention could be implemented to obtain many other kinds of expression/person data, with expression types indicated in various other ways, such as by expressions marked with semantic tags, and with users identified in other ways, such as by name or by login ID. Further, identity information about users could be obtained in other ways; for example, if the invention is implemented to obtain group information based on linguistically analyzable content of documents people access by scanning into a digital copier or other scanning machine, each person could have a key card or other such device that provides identity information to the machine. More sophisticated techniques might sense characteristics of a person in order to obtain identity information automatically.

The implementation described above uses a relatively simple database that can be created, maintained, and interrogated by Unix commands, and searches the database by lemmatizing and expanding the words of a query and then comparing the expanded query with lemmas in database entries. The invention could, however, be implemented with a conventional, commercially available database, in which case it may be possible to obtain group information by providing the query directly to the database, relying on the database lookup software to find related database entries that show a group of people who have accessed resources with similar conceptual content.

The implementation described above obtains group information by obtaining and presenting a list of database entries in an order that indicates a group of people who have accessed Web pages with similar conceptual content. The invention could be implemented to obtain group information of various other kinds and to obtain the group information in various other ways. For example, a profile could be obtained for each person, listing all the expression types the person has accessed over a given period of time and possibly also indicating frequency of accessing resources that include instances of each expression types, and the profiles of different people could be compared to obtain a measure of similarity between profiles or to cluster the profiles in an appropriate comparison space, with each cluster indicating a group of people. For example, the lists for two different people could be compared by using a technique similar to that in boxes 340 and 342 in FIG. 5, expanding each lemma in each list and comparing the expanded lists of lemmas to find the number of matches, which would indicate a measure of similarity between the two lists.

In the implementation described above, a person can switch into a work mode during which expression/person data is acquired by changing a proxy address, but the invention could be implemented without distinct acquisition and non-acquisition modes, and acquisition and non-acquisition modes could be implemented in various other ways, including the possibility of providing a visual cue to a person indicating when in acquisition mode and the possibility of allowing a user to switch back and forth by selecting a field or other selectable unit of a display.

In the implementation described above, linguistic analysis is performed for English text and a query can be provided in English, but the invention could be implemented with linguistic analysis in any of a number of languages, with cross-lingual querying, and with the user able to choose the query language.

The implementation described above could be supplemented with additional navigation tools, such as tools for identifying Web pages that have similar conceptual content. The implementation could also be supplemented with a time decay protocol for determining how long a Web page entry remains in the database.

The implementation described above could also be supplemented by enabling a person viewing a Web page in acquisition mode to make a recommendation of the Web page for a recommender system, such as the Knowledge Pump system described in Glance, N., Arregui, D., and Dardenne, M., "Knowledge Pump: Supporting the Flow and Use of Knowledge", in Borghoff, U.M. and Pareschi, R., Eds., *Information Technology for Knowledge Management*, Berlin: Springer-Verlag, 1998, pp. 35–51. Features of such a system are also described in copending, coassigned U.S. patent application Ser. Nos. 09/305,845 (Attorney Docket No. D/99273), entitled "System for Providing Document Change Information for a Community of Users" and 09/305,435 (Attorney Docket No. D/99274), entitled "System and Method for Collaborative Ranking of Search Results Employing User and Group Profiles Derived from Document Collection Content Analysis", both incorporated herein by reference.

In another variation, expression/person information used to obtain group information in accordance with the invention could also be used in a recommender system. For example, to obtain a prediction of a person's interest in a Web page, the person's profile could be compared to lemmatized forms of expressions on the Web page in a manner similar to that described above for profile comparison.

In the implementation described above, specific acts are performed that could be omitted or performed differently.

In the implementation described above, acts are performed in an order that could be modified in many cases. For example, in FIG. 5, in work mode, indexing, in box 330, could be performed sequentially before a Web page is displayed rather than in parallel in the background, though this would delay the time before the Web page is presented.

The implementation described above uses currently available computing techniques, but could readily be modified to use newly discovered computing techniques as they become available.

E. Applications

The invention can be applied to obtain group information for a wide variety of purposes, and would be especially useful to find groups of people with similar interests within an organization or other population. As noted above, such information could also be used for targeted marketing.

As mentioned above, the invention could also be applied to bootstrap a recommender system such as Knowledge Pump.

The invention could also be applied to obtain information that can be used with a shared bookmark system of the type described in copending, coassigned U.S. patent application Ser. No. 09/CCC,CCC (Attorney Docket No. D/99201), entitled "System and Method for Searching and Recommending Documents in a Collection using Shared Bookmarks", incorporated herein by reference.

The invention could be applied to obtain group information from a wide variety of different kinds of resource access behavior. Examples of behaviors that access resources include activities that store, retrieve, or modify resources that exist in machine-accessible form. A resource may, for example, be accessed by retrieving it for presentation on a display or for printing. Additional examples of behaviors that access resources include activities that access resources in another physical form to produce a machine-accessible form, such as by scanning a document to create an electronic version or by providing speech for recording in machine-accessible form. A resource could also be accessed during editing or input of text with a keyboard or other manual input device.

F. Miscellaneous

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of finding groups within a population of people who have accessed resources that include linguistically analyzable content, the method comprising:
    (A) obtaining expression/person data identifying, for each of a set of expression types that occur in the linguistically analyzable content of the resources, at least one person in the population who has accessed a resource that includes an instance of that type; and
    (B) using the expression/person data to obtain group information indicating at least one group of people in the population who have accessed resources that include instances of expression types that have similar conceptual content.

2. The method of claim 1 in which the resources are Web pages and the linguistically analyzable content is text, the text including instances of expression types, and in which (A) comprises:
    (A1) using the text of a Web page accessed by a person to obtain an item of type data indicating an expression type that occurs in the text; and
    (A2) associating the item of type data with an identifier of the person to obtain an item of expression/person data.

3. The method of claim 2 in which (A2) is performed automatically and in which (A1) comprises:
    receiving an access request from a person, the access request including a universal resource location (URL);
    using the URL to access the Web page and present the Web page to the person;
    using the Web page to automatically obtain the text; and
    automatically performing linguistic analysis on the text to obtain the item of type data.

4. The method of claim 3 in which (A1) and (A2) are performed only after the person has provided a signal indicating that expression/person data can be obtained.

5. The method of claim 1 in which the expression/person data include concept/person items of data, each indicating a conceptual type of expressions and identifying at least one person who has accessed a resource that includes an instance of the conceptual type, and in which (A) comprises:
    linguistically analyzing content of a resource accessed by a person to obtain an item of concept data indicating a conceptual type of an expression that occurs in the resource; and
    associating the item of concept data with an identifier of the person to obtain an item of concept/person data.

6. The method of claim 5 in which one of the concept/person items of data includes a set of normalized words and a syntactic relation identifier identifying a type of syntactic relation, the resource including a set of words that are forms of the set of normalized words and that are related to each other in accordance with the identified syntactic relation.

7. The method of claim 1 in which (B) comprises:
    (B1) storing the expression/person data in a database;
    (B2) receiving a query signal from a user, the query signal including a set of one or more expressions;
    (B3) using the query signal to access the expression/person data in the database and obtain database output data indicating a group of people in the population who have accessed resources that include instances of expression types that are likely to have meanings similar to the set of expressions indicated by the query signal; and
    (B4) using the database output data to present information to the user about the indicated group of people.

8. The method of claim 7 in which the expression/person data also include, for each expression type, a set of one or more resource handles that can be used to access resources that include instances of the expression type, and in which (B4) includes:
    presenting representations of resource handles of resources that have been accessed by people in the indicated group.

9. The method of claim 8 in which the resource handles are universal resource locations (URLs).

10. The method of claim 7 in which (B) comprises:
    using the expression/person data to obtain profile data indicating, for a set of people, expression types occurring in resources each person has accessed;
    using the profile data to obtain, for pairs of people in the set, similarity data indicating a measure of similarity between the resources accessed by the people in each pair; and
    using the similarity data to obtain the group information.

11. A system for finding groups within a population of people who have accessed resources that include linguistically analyzable content, the system comprising:
    at least one device that can be used to access the resources; each device, when used by a person, providing identity information indicating the person's identity; and
    processing circuitry connected for receiving the identity information and the content of the accessed resources; the processing circuitry operating to:
        use the identity information and the content of the accessed resources to obtain expression/person data identifying, for each of a set of expression types that occur in the linguistically analyzable content of the resources, at least one person in the population who has accessed a resource that includes an instance of that type; and
        use the expression/person data to obtain group information indicating at least one group of people in the population who have accessed resources that include instances of expression types that have similar conceptual content.

12. The system of claim 11 in which the device has input circuitry for receiving signals from people; the system having an acquisition mode for the device in which the processing circuitry uses the identity information from the device and the content of resources accessed through the device to obtain the expression/person data and a non-acquisition mode in which the processing circuitry does not; the system switching between the acquisition mode and the non-acquisition mode in response to a switch signal from the input circuitry.

13. The system of claim 11 in which the device is a computer.

14. The system of claim 11 in which the device comprises a scanner for obtaining machine-accessible forms of images.

15. The system of claim 11 in which the device is a copier.

16. The system of claim 11 in which the device is a printer.

17. The system of claim 11, further comprising:

a database accessible by the processing circuitry; and an input device connected for providing to the processing circuitry query signals from a user, each query signal including a set of one or more expressions;

the processing circuitry further operating to:
store the expression/person data in the database; and
in response to a query signal:
use the query signal to access the expression/person data in the database and obtain database output data indicating a group of people in the population who have accessed resources that include instances of expression types that have conceptual content similar to the set of expressions indicated by the query signal; and
use the database output data to present information to the user about the indicated group of people.

18. The system of claim 17 in which the expression/person data also include, for each expression type, a set of one or more resource handles that can be used to access resources that include instances of the expression type, and in which the system further comprises:

a display connected for presenting images in response to signals from the processing circuitry;

the processing circuitry, in operating to use the database output data to present information:
presenting representations of resource handles of resources that have been accessed by people in the indicated group.

19. An article of manufacture for use in a system for finding groups within a population of people who have accessed resources that include linguistically analyzable content; the system including:

at least one device that can be used to access the resources; each device, when used by a person, providing identity information indicating the person's identity;

a storage medium access device; and a processor connected for receiving the identity information and the content of the accessed resources;

the article of manufacture comprising:
a storage medium; and
instruction data stored by the storage medium; the instruction data indicating instructions the processor can execute; the processor, in executing the instructions:
using the identity information and the content of the accessed resources to obtain expression/person data identifying, for each of a set of expression types that occur in the linguistically analyzable content of the
resources, at least one person in the population who has accessed a resource that includes an instance of that type; and
using the expression/person data to obtain group information indicating at least one group of people in the population who have accessed resources that include instances of expression types that have similar conceptual content.

20. A method of operating a first machine to transfer data to a second machine over a network, the second machine including:

at least one device that can be used to access resources; each device, when used by a person, providing identity information indicating the person's identity;

a memory for storing instruction; and a processor connected for receiving the identity information and the content of the accessed resources and for accessing the memory;

the method comprising:
establishing a connection between the first and second machines over the network; and
operating the first machine to transfer instruction data to the memory of the second machine; the instruction data indicating instructions the processor can execute; the processor, in executing the instructions, finding groups within a population of people who have accessed resources that include linguistically analyzable content; the processor operating to:
use the identity information and the content of the accessed resources to obtain expression/person data identifying, for each of a set of expression types that occur in the linguistically analyzable content of the resources, at least one person in the population who has accessed a resource that includes an instance of that type; and
use the expression/person data to obtain group information indicating at least one group of people in the population who have accessed resources that include instances of expression types that have similar conceptual content.

* * * * *